United States Patent [19]

Shiber

[11] 4,223,532
[45] Sep. 23, 1980

[54] AUTOMOTIVE ENERGY MANAGEMENT SYSTEM

[76] Inventor: Samuel Shiber, P.O. Box 371, Mundelein, Ill. 60060

[21] Appl. No.: 63,144

[22] Filed: Aug. 2, 1979

Related U.S. Application Data

[63] Continuation-in-part of Ser. No. 9,673, Feb. 5, 1979, and a continuation-in-part of Ser. No. 9,674, Feb. 5, 1979, which is a continuation-in-part of Ser. No. 875,731, Feb. 6, 1978, Pat. No. 4,175,389.

[51] Int. Cl.³ ............................................. F16D 31/02
[52] U.S. Cl. ........................................ 60/414; 60/435; 60/437; 60/439; 60/490
[58] Field of Search ................ 60/414, 418, 435, 437, 60/438, 439, 487, 490; 74/687

[56] References Cited

U.S. PATENT DOCUMENTS

| | | | |
|---|---|---|---|
| 3,396,607 | 8/1968 | Ross | 74/687 |
| 3,587,233 | 6/1971 | Fischbach | 60/418 X |
| 3,903,696 | 9/1975 | Carman | 60/414 |
| 4,018,052 | 4/1977 | Laussermair | 60/414 |
| 4,037,409 | 7/1977 | Leibach | 60/435 X |
| 4,098,144 | 7/1978 | Besel et al. | 74/687 |

FOREIGN PATENT DOCUMENTS

| | | |
|---|---|---|
| 203867 | 9/1923 | United Kingdom . |
| 753512 | 7/1956 | United Kingdom . |
| 814478 | 6/1959 | United Kingdom . |
| 1204021 | 9/1970 | United Kingdom . |

*Primary Examiner*—Irwin C. Cohen
*Attorney, Agent, or Firm*—Samuel Shiber

[57] ABSTRACT

A hydromechanical/hydrostatic automotive energy management system comprising two hydraulic units, the system adapted to provide: An efficient, continuously variable optimal transmission ratio, an intermittent optimal engine operation in city traffic and regenerative braking, thereby, the system is able to reduce a car's fuel consumption by as much as one half while improving drivability.

17 Claims, 5 Drawing Figures

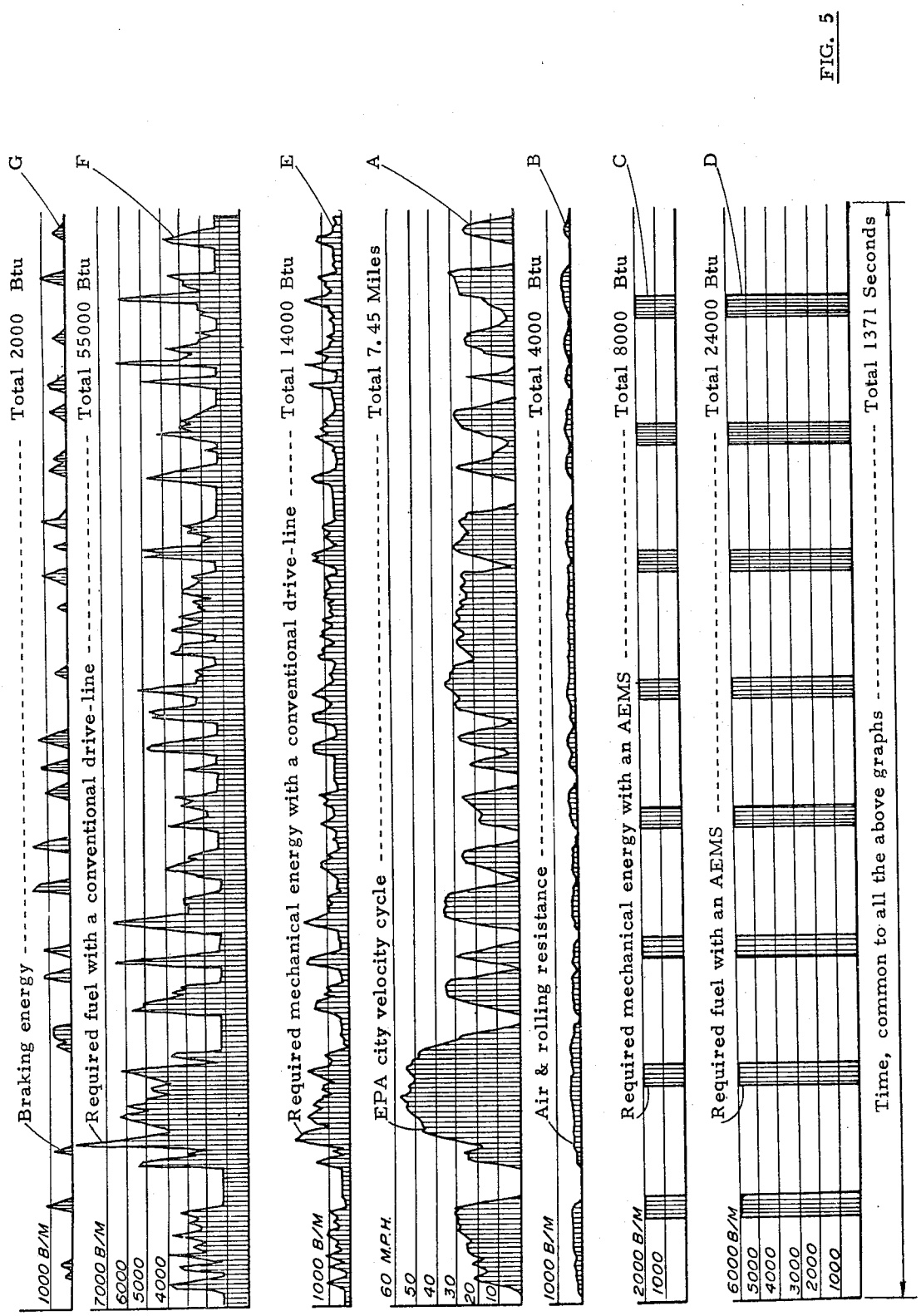

AUTOMOTIVE ENERGY MANAGEMENT SYSTEM

CROSS REFERENCE TO OTHER U.S. PATENT APPLICATIONS

This application is a continuation in part of my co-pending application Ser. Nos. 9,673 & 9,674, both filed on Feb. 5, 1979, which are continuation in part applications of my co-pending patent application Ser. No. 875,731 filed on Feb. 6, 1978 now U.S. Pat. No. 4,175,389 issued on Nov. 27, 1979.

The above applications are hereby being incorporated by reference.

REFERENCES

1. Garrett/Airesearch study for the Energy Research and Development Administration Division of Transportation Energy Conversion (TE), Office of Highway Vehicles, Vehicular System Branch, prepared under contract EY-76-C-03-1095, Oct. 20, 1978.
2. Automatic and Semi-automatic Gearboxes for Heavy Commercial Vehicles, Papers read at the Conference held at St. John Hotel, Solihull on Mar. 1–9, 1978 (available through the Society of Automotive Engineers, SAE).
3. SAE Paper #780688 titled Development of an Automotive Hydromechanical Transmission.
4. SAE Paper #790042 titled Purely Hydrostatic High Ratio Transmission, which is herein being incorporated by reference.
5. Mechanix Illustrated Magazine November 1977 issue page 60+.

BACKGROUND OF THE INVENTION

Due to the limited supply of gasoline and its corresponding high cost, the importance of minimizing fuel waste in vehicles has taken new dimensions in recent years.

Presently automobiles waste fuel in several ways, some of which are:

1. During braking the vehicle's kinetic energy is transformed to wasted heat.
2. When moving in congested traffic, the engine operates very inefficiently and is running continuously even when the vehicle is standing.
3. Present transmissions usually have a few fixed ratios vs. an infinitely variable transmission which can continuously provide an optimal ratio. Further, present day automatic transmissions introduce additional power losses in the torque converter and hydraulic pump areas.

The object of the present system is to provide a system which will eliminate the above and other inefficiencies.

The advantages of regenerative braking, intermittent engine operation at an optimal speed and an infinitely variable transmission, as well as the value of these features to the fuel economy of a vehicle, are all known. Buses equipped with hydrostatic regenerative braking have shown a 30 percent reduction in fuel consumption in actual road tests conducted in the U.K. by the National Engineering Laboratory (please note reference No. 2). Intermittent optional engine operation in city traffic can further reduce fuel consumption by about the same amount in slow urban traffic (please note reference No. 5). However, to date, no system has been built that would provide these features without introducing undesirable and intolerable side effects of cost, complexity and bulk.

SUMMARY OF THE PRESENT INVENTION

The present invention relates to a hydromechanical/hydrostatic automotive power transmission which is adapted to incorporate regenerative braking and intermittent optimal engine operation in one simple, compact, light and inexpensive hardware package.

The transmission is adapted to operate in several modes in order to maximize fuel economy in various driving conditions: over the highway the transmission provides a direct mechanical drive (lock-up); when descending a long incline it operates in over-drive; in the suburbs the transmission is in hydromechanical modes; and in stop-and-go traffic the transmission is fully hydrostatic, enabling the engine to operate optimally and intermittently, charging an accumulator and shutting itself off until the accumulator is almost depleted, at which point the transmission restarts the engine which recharges the accumulator, etc.

During braking the transmission efficiently converts the vehicle's kinetic energy to pressurized fluid stored in the accumulator, to be reused for reaccelerating the vehicle or for some other needed auxiliary function.

While all the above features and their fuel saving value is well established in the industry, as mentioned previously, the unique aspect of this design is that it achieves all these goals without introducing unacceptable side effects of complexity, cost or bulk. On the contrary, it provides all these features with a system the hardware of which is substantially simpler than present day automatic transmissions. Further, the present system eliminates the conventional starting system, part of the braking system, it does the majority of actual braking and it allows a substantial reduction in engine's size.

It can also be noted that the two hydraulic units, which are combined in a unique way to form the transmission, are similar to conventional piston pumps and motors. Thus, the present design does not require any unproven or non-existing technology or manufacturing processes. (The term "hydraulic unit," throughout this application shall mean a device comprising two members rotatable one relative to the other as a result of, or as a cause of, pressurized fluid flow through the device. In the first instance the device acts as a motor and in the second instance it acts as a pump. One member of the device shall be designated "input/output member" and the other a "reaction member." To some extent the choice of labeling the members is arbitrary, especially in cases in which both members rotate. In the case of the present text the member which is all the time, or part of the time, anchored to the housing shall be designated the "reaction member" and the other member will be called the "input/output member" since both devices act, alternately, as a pump and as a motor).

The control is preferably based on an electronic micro-processor to translate driver's inputs through the brake, accelerator and gear shift levers to optimal setting of the transmission and engine elements.

DETAILED DESCRIPTION OF THE DRAWINGS

Figure 1:
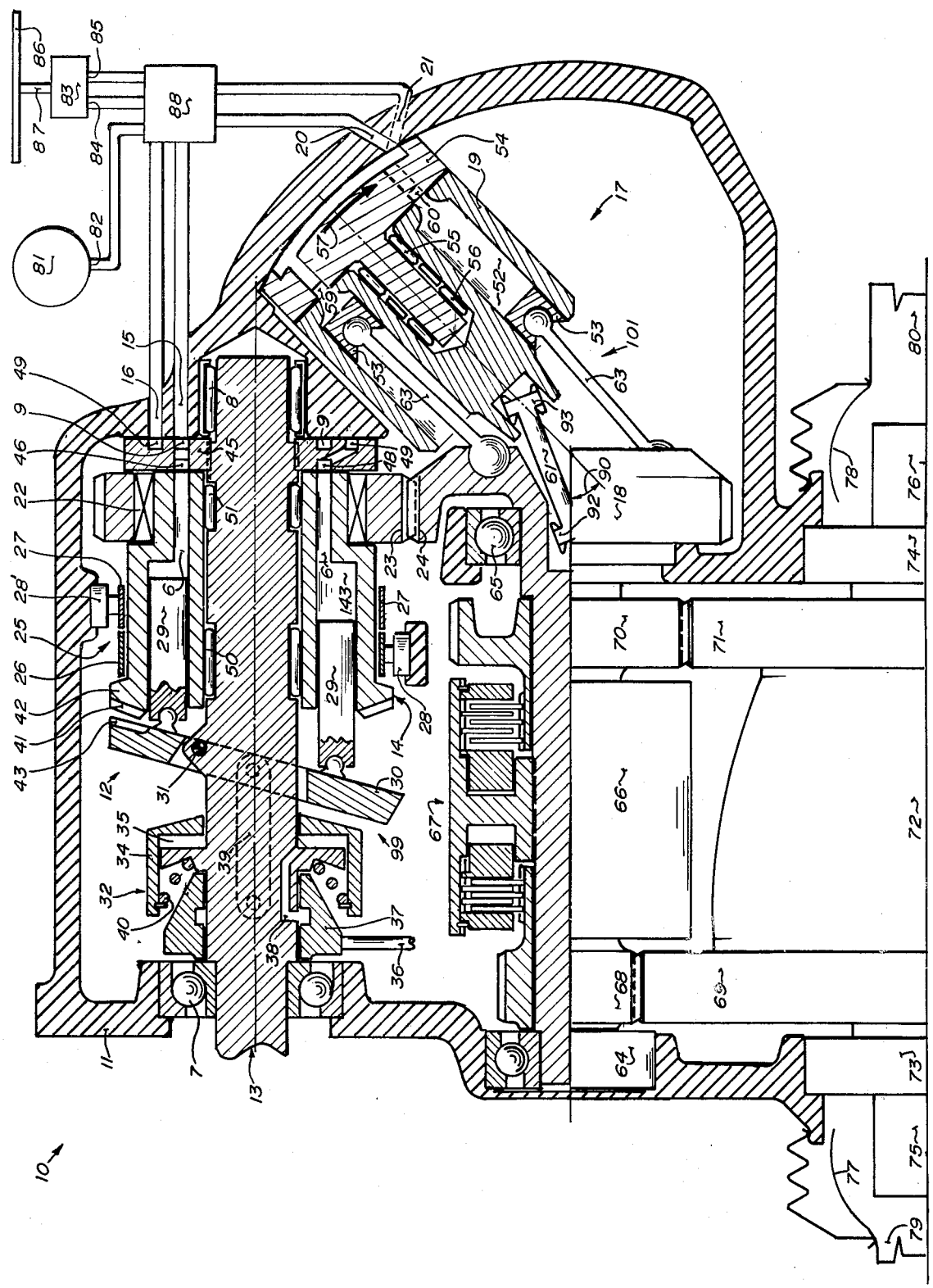
FIG. 1 is a cross sectional view of a first embodiment of the present invention and FIG. 2 shows a second embodiment of the same, FIGS. 3 and 4 generally show side and top views, respectively, of the major components of the present invention as arranged in a front wheel drive car, and, FIG. 5 shows graphs comparing the energy management and usage by a conventional car vs. a car equipped with the present invention.

FIG. 1 shows an automotive energy management system 10 comprising a housing 11, a first hydraulic unit 12 having a first input/output member 13 rotatably supported by bearings 7 and 8, a first reaction member 14, a first inlet port 15, and a first outlet port 16.

A second hydraulic unit 17 having a second input/output member 101, a second reaction member 54 which is coupled to the housing 11 for obtaining therefrom an external reaction to torque developed in the second hydraulic unit, a second inlet port 20 and a second outlet port 21. A one-way clutch 22 is adapted for selectively coupling the first reaction member 14 to the second input/output member 101 through meshed gears 23 and 24.

A brake assembly 25 is adapted for selectively anchoring the first reaction member 14 to the housing 11. The assembly 25 is made of a pair of bands 26 and 27 actuated by servo cylinders 28 and 28', respectively, which are spaced 180 degrees one from the other in order to cancel undesirable radial forces generated by the brake assembly 25.

The first hydraulic unit 12 uses a swash plate type of mechanism 99 to vary the stroke of pistons 29. The mechanism 99 comprises a swash plate 30 inclinable on a pivot 31 by an actuator 32 which is tied to the swash plate 30 via a pair of links 39 (one shown). The actuator 32 comprises a cylinder 34 having a cavity 35 into which servo-pressure is directed via a tube 36, a sleeve 37, and a passage 38. The actuator 32 also contains a conical compression spring 40 which biases the swash plate 30 to an extreme inclined position which in turn causes the teeth 41 formed on the periphery of a drum 42 to mesh with teeth 43 formed on the edge of the swash plate 30, thereby locking the drum 42 which is a part of the first reaction member 14 to the swash plate 30 which is part of the first input/output member 13.

The drum 42 defines axial bores 143 in which the pistons 29 are slideably disposed, each having a shoe for bearing against the swash plate 30.

A distributor plate 45 which is keyed to, rotates with and forms a part of the first input/output member 13 defines a first crescent shaped port 46 which is in communication with the first inlet port 15 via a first ring groove 9, and a second crescent shaped port 48 which is in communication with the first outlet port 16 via a second ring groove 49 (both crescent shaped ports are shown 90 degrees out of position). When the drum 42 rotates relative to the first input/output member 13 on needle bearings 50 and 51 the pistons 29 are forced into their respective bores during which time these bores are in communication via passages 6 with the port 48. When the pistons 29 reverse their movement the drum 42 is indexed over the distributor plate so that the respective bores are in communication with the port 46.

The second hydraulic unit 17 shown in a fully stroked position is a bent-axis type which is typified by having a wide usable displacement ratio spread, a high starting torque, and it also poses no structural or packaging or plumbing problems when used as shown. It comprises the second input/output member 101 having a drum 19 defining bores 52 in which pistons 53 are slideable. The drum 19 is rotatably supported by a distributor plate 54 through needle bearings 55 and 56. The distributor plate 54 constitutes the second reaction member of the second hydraulic unit. It does not rotate but it can be swung in an arc in the direction of arrow 57 to de-stroke the pump and, vice versa, by a conventional servo mechanism (not shown) which is connected to a control to be discussed later. The distributor plate 54 is coupled to the housing 11 for obtaining therefrom an external reaction to torque developed in the second hydraulic unit 17. The distributor plate 54 also defines a first crescent shaped port 59 connected to the second inlet port 20 and a second crescent shaped port 60 which is connected to the second outlet port 21 (both crescent shaped ports are shown 90 degrees out of position). As the drum 19 rotates bores containing pistons moving inward are in communication with the port 60 and bores containing pistons moving outward are in communication with the port 59.

The rotation of the drum 19 is synchronized with the rotation of the second portion 18 of the second input/output member 101 by a link 61 whose ends are coupled to both pieces by constant velocity joints 92 and 93, and the pistons 53 are connected to the second input/output portion 18 by push-rods 63. (For additional design details of a bent axis hydraulic unit please refer to reference No. 4). The outer periphery of the first input/output portion 18 constitutes the gear 24 and its center portion, which is being rotatably supported by the housing 11 through ball-bearings 64 and 65, supports a housing 66 of a twin clutch pack 67 of a type commonly used in industrial power-shifting transmissions. The clutch pack 67 can couple either a gear 68 which is in mesh with a gear 69 and thereby establish a low range ratio, or it can couple a gear 70 which is in mesh with a gear 71 and thereby establish a high range ratio. The gears 69 and 71 are both attached to and supported by a differential assembly 72 which is rotatably supported by the housing 11 through ball bearings 73 and 74.

Two shafts, 75 and 76, extend from the differential 72 to drive wheels 89 (please note FIG. 4) of a car through constant velocity joints 77 and 78 and extension shafts 79 and 80.

An accumulator 81 having an inlet/outlet port 82 is adapted for storing energy in the form of pressurized fluid. Optionally, the storage capacity of the accumulator can be augmented by adding a third hydraulic unit 83 having a third inlet port 84 and a third outlet port 85. A flywheel 86 is coupled to an input/output member 87 of the third hydraulic unit 83. When the third inlet port is connected to the inlet/outlet port 82 of the charged accumulator the unit 83 can convert hydrostatic energy to kinetic energy storable in the flywheel 86, and vice versa.

A control 88 adjusts the displacement of both hydraulic units 12 and 17, and it is connected via lines to all of the system's ports and can connect them one to the other, or others, to accomplish the various modes of operation which are discussed later on. The control 88 also receives inputs from the drive and an engine 100 and adjusts the engine and the system's elements in order to respond to the driver's inputs efficiently, however, the specific details of the control's construction and operation are outside the scope of this application.

Figure 2:
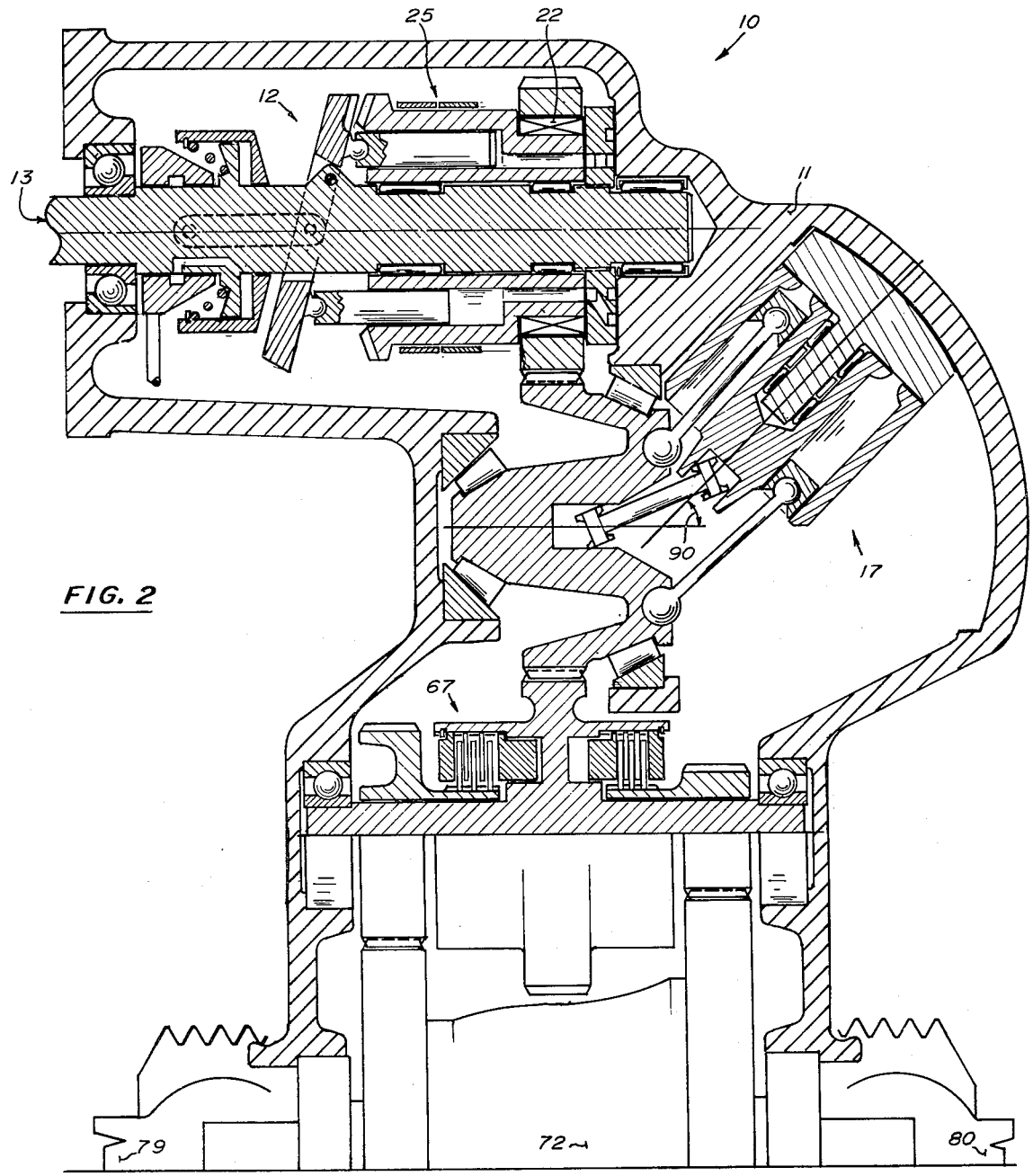

FIG. 2 shows the hardware elements of the lower portion of the system arranged in a way which extends the drop (the vertical distance between a transmission input and output shafts) of the system in a manner which is self-explanatory. Otherwise, the two embodiments are similar in construction and in operation and the same numerals are used for identifying major elements in both embodiments.

It should be noted that the drop of the embodiment shown in FIG. 1 can be extended by spacing the hydraulic units 12 and 17 further apart and coupling the gears 23 and 24 with a chain instead of the direct gear mesh shown in FIG. 1 (and it should be understood that the term "gear train" is meant to cover such optional forms of power transmission).

The arrangement of the hydraulic units 12 and 17 alongside one another (instead of in line as shown in the parent applications) allows the design of the porting of the first hydraulic unit 12 and the hydraulic lines connecting the two hydraulic units 12 and 17 in a conventional and an efficient manner.

OPERATION

Lock-up mode is accomplished hydraulically by inclining the swash plate 30 and blocking the first outlet port 16 which in turn locks the members 13 and 14 one to the other. The lock-up can be converted into a mechanical lock-up by dropping the pressure prevailing in the cavity 35 and thereby allowing the spring 40 to incline the swash plate 30 to an extreme position, meshing the teeth 41 and 43 and mechanically locking the first hydraulic unit 12. In the mechanical lock-up mode the hydraulic system can be relaxed eliminating power losses associated therewith and eliminating the minute slip which can be expected with the hydraulic lock-up. The hydraulic lock-up also acts as a synchronizer for shock-less engagement and disengagement of the teeth 41 and 43. During a mechanical lock-up the speed ratio and torque ratio of the system are both 1:1, and the efficiency (neglecting bearings' friction, gear train losses, etc.) is 100 percent.

Hydromechanical forward reduction mode is accomplished by stroking both pumps and connecting the first outlet port 16 to the second inlet port 20. To illustrate this mode it will be assumed that the first input/output member 13 rotates together with the engine 100 which drives it at 3000 RPM and that the second input/output portion 18 rotates at 1500 RPM. It can be noted that at this specific speed ratio of 2:1 the relative speed between the two members of each of the hydraulic units is 1500 RPM (assuming that the gears 23 and 24 are with an equal number of teeth), thus, both pumps are set theoretically at equal displacements per revolution.

In this mode the power is split, the engine's torque is conveyed directly through the first hydraulic unit 12 to the second portion 18 of second input/output member 101 and the relative rotation occurring between the members of the first hydraulic unit 12 is conveyed to pressurized fluid flow which is translated by the second hydraulic unit 17, back to mechanical power and additional torque at the second portion 180 of second input/output member 101. With an increase of the displacement per revolution of the first hydraulic unit 12 vs. that of the second hydraulic unit 17 the transmission reduction ratio decreases, and vice versa.

Hydromechanical forward overdrive mode is accomplished by setting the first hydraulic unit 12 at a substantially larger displacement per revolution than that of the second hydraulic unit 17 and by connecting the first and second outlet ports 16 and 21, respectively, one to the other. (It may be noted that the various ports were named in reference to their function in the hydromechanical forward reduction mode, and that this designation is maintained throughout the text to avoid confusion). In this mode a part of the engine power is converted by the second hydraulic unit 17 into a pressurized fluid flow which is transmitted to the first hydraulic unit 12, which utilizes it to over-drive the first reaction member 14 relative to the first input/output member 13.

As can be noted, in this mode and in the previous hydromechanical mode, the engine's power is split, one part is carried mechanically through the system and the other part is converted to a pressurized fluid flow and transmitted hydrostatically. It should be noted further that the inefficiencies that typify a hydrostatic drive apply only to this part of the power which is transmitted hydrostatically.

Brisk acceleration sub-mode when the system is in either of the lock-up modes or in either of the hydromechanical modes, the inlet/outlet port 82 may be connected to the second inlet port 20 to boost the power delivered by the system to the wheels 89 for a short period. During this sub-mode the pressure at the port 20 has to be maintained below the accumulator's pressure.

Accumulator charging sub-mode during the hydromechanical and lock-up modes can be accomplished by obtaining or generating pressurized fluid and directing it into the input/output port 82 of the accumulator 81. During the hydromechanical modes such pressurized fluid may be obtained by diverting some of the pressurized fluid carrying the power between the first and second hydraulic units 12 and 17, respectively. During the hydraulic lock-up mode such pressurized fluid can be obtained from the first hydraulic unit 12. During either the mechanical or hydraulic lock-up mode the second hydraulic unit 17 can also be put to use as a source of pressurized fluid. In this mode the pressurized fluid source has to be maintained at a higher pressure than the pressure prevailing in the accumulator 81.

Hydromechanical reverse mode is accomplished by setting the second hydraulic unit 17 at a substantially larger displacement per revolution than that of the first hydraulic unit 12 and by connecting the first and second outlet ports 16 and 21, respectively, one to the other.

Hydrostatic forward mode (intermittent optimal engine operation mode) is accomplished by actuating the brake assembly 25 and thereby anchoring the first reaction member 14 to the housing 11, and by connecting the first outlet port 16, the second inlet port 20 and the inlet/outlet port 82 together.

In this mode the control 88 causes the engine to work intermittently at an optimum power output level charging the accumulator 81. When the accumulator is charged the control 88 shuts off the engine and the car continues to move, accelerate, stop, power its accessories, etc., on energy stored in the accumulator 81 until it is depleted to a certain pre-determined level at which point the control 88 restarts the engine to recharge the accumulator 81, etc. This mode is suitable for inner city driving.

Engine starting is accomplished by connecting the inlet/outlet port 82 of the charged accumulator 81 to the first inlet port 15 thereby causing the first hydraulic unit 12 to crank the engine 100.

Regenerative braking is accomplished by connecting the second outlet port 21 to the inlet/outlet port 82, causing the wheels 89 to drive the second hydraulic unit 17 and thereby convert the vehicle's kinetic energy to stored hydrostatic energy in the accumulator 81. The braking torque is adjusted by varying the degree of bent, as marked by an angle 90, of the axis of the second hydraulic unit 17. (In reverse the same mode can also be used by substituting port 20 for port 21).

Frictional braking can be achieved by simultaneously engaging both clutches of the twin clutch pack 67. Such braking can be used as an emergency brake, to hold a grade without creeping down or in reverse.

Figure 3:
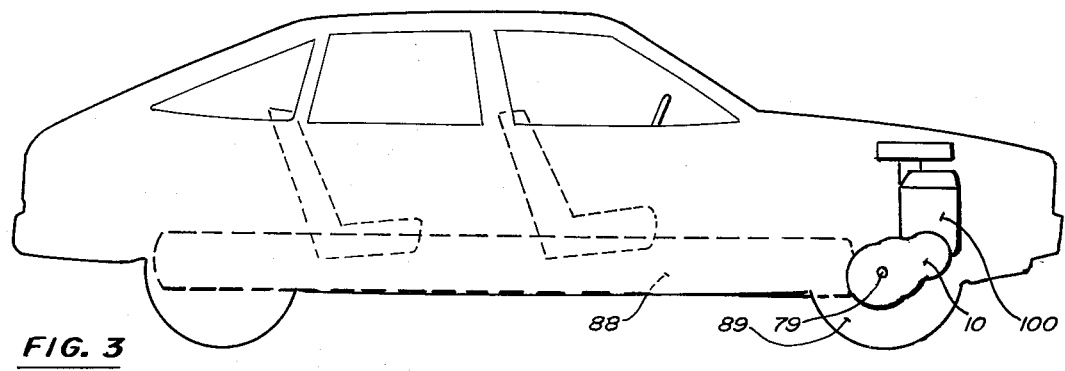
Figure 4:
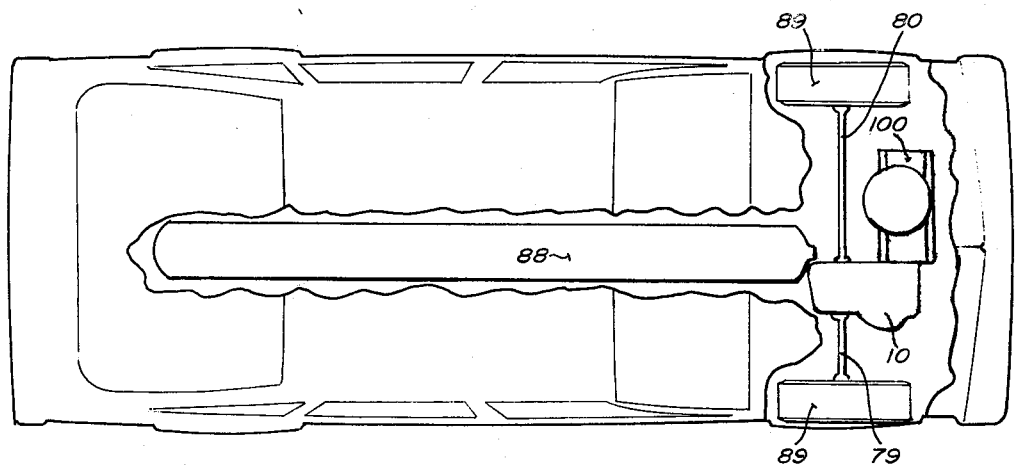

FIGS. 3 and 4 show the system 10 in a front wheel drive, transverse engine car such as for example General Motors' new X-body cars, a Volkswagen's Rabbit, or a Ford's Fiesta.

The high-low range shift enables the transmission, in its hydromechanical modes, to remain in or close to the direct ratio, both on an expressway (high) and in suburban driving (low), and thus maintain an overall high hydromechanical efficiency.

In urban driving the transmission is shifted into the hydrostatic mode, and at this point the projected operation of the system 10 in a car will be discussed: Upon entering the car and switching the ignition key on nothing happens. The driver shifts to "drive," and the car obeys smoothly. A mile or so down the road the engine automatically starts as explained previously, runs for about half a minute at an optimum diesel pump, or carburetor opening, and shuts off again while the driving continues unaffected. On an average, an urban mile takes three minutes, and in stop-and-go traffic it may take several times longer, but in either case the engine would work approximately the same half a minute per mile at maximum efficiency. The system 10 may use the high or low range, and various combinations of swash plate angles and axis bend angles to supply the demanded power at the drive wheels 89 at a maximum hydraulic efficiency. When the driver brakes, as previously explained, the car's kinetic energy is stored back in the accumulator 81. Although the car uses a downsized engine, it can accelerate briskly at any time without wasting energy since the hydraulic system is fully competible with, and efficient, during transient conditions, in a polar contrast to an internal combustion engine which is not, and at this point it may be worth stopping this short projected drive to look at graphical data of FIG. 5 which illustrates the use of energy in a car with, and without, this system 10.

Graph A shows the U.S. Environmental Protection Agency ("EPA") city cycle of car's velocity vs. time, and graph B shows the air resistance and rolling resistance that the car encounters along this cycle. Thus, graph B represents the inherent losses which no system can eliminate or even reduce.

Graphs C and D project how a car weighing 3500 pounds and equipped with an energy management system ("AEMS") negotiates the cycle, energy-wise, and graphs E and F show how the same car accomplishes the same task when equipped with a conventional drive line. Graph G shows the braking energy which is wasted with a conventional drive-line.

Taking a closer look at the graphs, graph B shows the inevitable frictional losses which amount to 4000 BTU. Assuming the AEMS has a 60 percent overall efficiency (since some of the energy which is returned into the accumulator by the regenerative braking may pass through the system twice) the AEMS will require an input of 6666 BTU. Assuming that the engine delivers 2000 BTU/MIN (47 HP) it will have to work about 4 minutes during the EPA cycle. During this time the engine's accessories will consume an additional 1000 BTU, raising the required energy to 7666 BTU.

Assuming that the accumulator can store 1000 BTU (13.5 gallon at 3000 PSI) between engine restart and shutoff points, there would be 8 cycles, each lasting half a minute of engine operation. Since about 40 BTU are lost in the restarting process and in the transient conditions which accompany it, additional 320 BTU are lost raising the total sum to around 8000 BTU. The engine's intermittent delivery of mechanical energy is shown in graph C. The engine operates at its maximum efficiency of 33 percent, therefore the required fuel energy amounts to 24000 BTU, as illustrated in graph D. For comparison, the conventional system requires 14000 BTU of mechanical energy (graph E) which requires 55000 BTU of fuel energy (graph F), which reflects a conventional engine efficiency of 25 percent (please note reference No. 1).

These results are not all that surprising. Looking at graphs E and F it becomes evident that the conventional car leaks energy like a sieve. For example:

Idling and deceleration constitute 15 percent and 25 percent of the time, respectively, of the EPA cycle, throughout which the engine and its accessories operate.

Even with a manual transmission there is a substantial amount of slip in the drive line when accelerating from a standstill.

Braking accounts for approximately 2000 BTU which are dissipated as heat (note graph G).

The system 10 eliminates these energy leaks.

Resuming the projected operation and taking to the open road, the system 10 shifts smoothly into the hydromechanical mode by releasing the brake 25 allowing the one-way clutch 22 to become engaged and readjusting the swash and tilt angles.

Reaching a level expressway the system 10 smoothly shifts to a hydraulic lock-up and then to a mechanical lock-up.

Physically the transmission is smaller than a conventional automatic transmission, however, it may be encapsulated with sound insulation which makes for the size difference. Packaging a 16 gallon accumulator and a low pressure sump of an equal volume can be done in several areas such as: in a tunnel under the car while routing the exhaust on the body's perimeter, or in the trunk. Assuming the use of an accumulator made of an aluminum liner externally reinforced with wound aramid fiber, such an accumulator should weigh around 50 to 100 pounds and it should have a tendency to fail by developing a leak (a large one in case of an accident) but not to explode. It is also worth noting that the working pressure of hydraulic systems is expected to climb to the 5000 psi plateau within several years, which would reduce, proportionately, the required accumulator and sump volumes.

While the present invention was illustrated by a limited number of embodiments it should be understood that various modifications and substitutions can be made without departing from the spirit of the invention or the scope of the claims.

I claim:

1. An automotive energy management system comprising in combination:

a housing, a first hydraulic unit having a first input/output member, a first reaction member, a first inlet port and a first outlet port, a second hydraulic unit having a second input/output member, a second reaction member which is coupled to said housing for obtaining therefrom an external reaction to torque developed in said second hydraulic unit, a second inlet port and a second outlet port, clutch means for selectively coupling said first reaction member to said second input/output member, and, brake means for selectively anchoring said first reaction member to said housing.

2. The system of claim 1 wherein said clutch is a one-way clutch.

3. The system of claim 1 wherein one of said hydraulic units is a variable displacement hydraulic unit.

4. The system of claim 1 wherein both hydraulic units are variable displacement hydraulic units.

5. The system of claim 1 wherein said first hydraulic unit is a swash plate type of a unit.

6. The system of claim 1 wherein said second hydraulic unit is a bent axis type of a unit.

7. The system of claim 1 wherein said first hydraulic unit is a swash plate type of a unit and said second hydraulic unit is a bent axis type of a unit.

8. The system of claim 1 wherein said hydraulic units are arranged one alongside the other.

9. The system of claim 9 wherein said first reaction member carries a swash-plate and a distributor plate between which said first reaction member is sandwiched.

10. The system of claim 8 wherein said first reaction member is coupled to said second input/output member through a one-way clutch and a gear train.

11. The system of claim 10 wherein said second input/output member supports two clutch assemblies.

12. The system of claim 1 wherein said system also has an energy storage means with at least one inlet/outlet port and control means for connecting said inlet/outlet port to at least one of said other ports.

13. The system of claim 12 wherein said energy storage system comprises an accumulator.

14. The system of claim 12 wherein said energy storage system comprises a third hydraulic unit having an inlet port and an outlet port which are connected to said control, and a flywheel which is coupled to an input/output member of said third hydraulic unit.

15. The system of claim 1 having a lock-up for mechanically coupling said first input/output member to said first reaction member.

16. The system of claim 15 wherein a swash plate, which is a part of said first input/output member, and a periphery of said first reaction member are both fitted with teeth, and wherein said lock-up is accomplished by bringing said teeth into mesh.

17. The system of claim 16 wherein said lock-up is accomplished by inclining said swash plate to an extreme position.

* * * * *